US012574298B2

(12) United States Patent
Zhao et al.

(10) Patent No.: US 12,574,298 B2
(45) Date of Patent: Mar. 10, 2026

(54) MACHINE LEARNING MODEL DISTRIBUTION

(71) Applicant: Nokia Technologies Oy, Espoo (FI)

(72) Inventors: Qiyang Zhao, Antony (FR); Stefano Paris, Vanves (FR); Muhammad Majid Butt, Palaiseau (FR); Janne Ali-Tolppa, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 210 days.

(21) Appl. No.: 18/277,172

(22) PCT Filed: Feb. 4, 2022

(86) PCT No.: PCT/EP2022/052714
§ 371 (c)(1),
(2) Date: Aug. 14, 2023

(87) PCT Pub. No.: WO2022/171536
PCT Pub. Date: Aug. 18, 2022

(65) Prior Publication Data
US 2024/0097993 A1      Mar. 21, 2024

(30) Foreign Application Priority Data

Feb. 15, 2021      (FI) ...................................... 20215150

(51) Int. Cl.
*H04L 41/16* (2022.01)
*H04L 41/0893* (2022.01)
*H04W 24/02* (2009.01)

(52) U.S. Cl.
CPC .......... *H04L 41/16* (2013.01); *H04L 41/0893* (2013.01); *H04W 24/02* (2013.01)

(58) Field of Classification Search
CPC ..... H04L 41/0893; H04L 41/16; H04W 24/02
See application file for complete search history.

(56) References Cited

U.S. PATENT DOCUMENTS

2004/0185786 A1* 9/2004 Mirbaha .............. H04B 17/373
                                                              455/67.11
2019/0258756 A1* 8/2019 Minwalla ............... G06N 20/00
                    (Continued)

FOREIGN PATENT DOCUMENTS

CN          103080855 A      5/2013
CN          105303197 A      2/2016
                    (Continued)

OTHER PUBLICATIONS

Mcmahan et al., "Communication-Efficient Learning of Deep Networks from Decentralized Data", Proceedings of the 20th International Conference on Artificial Intelligence and Statistics (AISTATS), vol. 54, Apr. 20-22, 2017, 10 pages.
                    (Continued)

*Primary Examiner* — Gil H. Lee
(74) *Attorney, Agent, or Firm* — Nokia Technologies Oy

(57)          ABSTRACT

According to an example embodiment, a client device is configured to receive a validation model from a centralised unit device, wherein the validation model includes a machine learning model configured to predict an output from an input based on a plurality of model parameters; collect radio measurements corresponding to the input of the validation model and parameters corresponding to the output of the validation model; obtain predicted parameters as the output of the validation model by feeding the collected radio measurements as the input into the validation model; compare the collected parameters and the predicted parameters; compute a plurality of gradient vectors for the plurality of model parameters of the validation model based on the comparison between the collected parameters and the predicted parameters; and transmit the plurality of gradient vectors for the plurality of model parameters of the validation model to the centralised unit device.

15 Claims, 7 Drawing Sheets

(56) References Cited

U.S. PATENT DOCUMENTS

| | | | | |
|---|---|---|---|---|
| 2019/0258962 | A1 | 8/2019 | Sreekumari et al. | |
| 2020/0186227 | A1 | 6/2020 | Reider et al. | |
| 2020/0265328 | A1 | 8/2020 | Kaditz et al. | |
| 2020/0327434 | A1 | 10/2020 | Maeser | |
| 2020/0382968 | A1 | 12/2020 | Gupta et al. | |
| 2021/0049408 | A1* | 2/2021 | Roune | G06F 18/2148 |
| 2021/0287141 | A1* | 9/2021 | Molloy | G06F 18/22 |
| 2022/0114401 | A1* | 4/2022 | Cmielowski | G06F 18/2185 |

FOREIGN PATENT DOCUMENTS

| | | | |
|---|---|---|---|
| CN | 106575312 | A | 4/2017 |
| CN | 109754105 | A | 5/2019 |
| CN | 111047591 | A | 4/2020 |
| CN | 111814399 | A | 10/2020 |
| WO | 2020/229684 | A1 | 11/2020 |

OTHER PUBLICATIONS

"Unified architecture for machine learning in 5G and future networks", Focus group on Machine Learning for Future Networks including 5G (FG-ML5G), Recommendation ITU-T FG-ML5G-ARC5G, Jan. 2019, 31 pages.
"3rd Generation Partnership Project; Technical Specification Group Services and System Aspects; Study of Enablers for Network Automation for 5G (Release 16)", 3GPP TR 23.791, V16.2.0, Jun. 2019, pp. 1-124.
"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.2.0, Jul. 2020, pp. 1-78.
"3rd Generation Partnership Project; Technical Specification Group Radio Access Network; NR; NR and NG-RAN Overall Description; Stage 2 (Release 16)", 3GPP TS 38.300, V16.2.0, Jul. 2020, pp. 1-148.
Office action received for corresponding Finnish Patent Application No. 20215150, dated Jul. 8, 2021, 9 pages.
Elbir et al., "Federated Learning for Channel Estimation in Conventional and IRS-Assisted Massive MIMO", arXiv, Aug. 25, 2022, pp. 1-13.
Bennis, "Federated Learning and Control at the Wireless Network Edge", GetMobile: Mobile Computing and Communications, vol. 24, No. 03, Sep. 2020, pp. 9-13.
"3rd Generation Partnership Project; Technical Specification Group Services and System Aspects; Study on traffic characteristics and performance requirements for AI/ML model transfer in 5GS (Release 18)", 3GPP TR 22.874, V0.2.0, Nov. 2020, pp. 1-65.
Office action received for corresponding Finnish Patent Application No. 20215150, dated Dec. 20, 2021, 6 pages.
Office action received for corresponding Finnish Patent Application No. 20215150, dated Sep. 21, 2022, 5 pages.
Office action received for corresponding Indian Patent Application No. 202317050387, dated May 13, 2025, 6 pages.
Office action received for corresponding Chinese Patent Application No. 202280014968.2, dated Jan. 20, 2026, 6 pages of office action and 2 pages of translation available.
Zhu et al., "Wireless Propagation Prediction Model Based on XGBoost", Software Guide, vol. 19, No. 08, Aug. 2020, 6 pages.
Yang et al., "Error Compensation of Rotary Body Measurement System Based on Gradient Boosting Decision Tree", Modular Machine Tool & Automatic Manufacturing Technique, No. 05, May 2020, 6 pages.

* cited by examiner

100

1100

1101 — Receive validation model

1102 — Collect radio measurements

1103 — Obtain predicted parameters

1104 — Compare parameters

1105 — Compute gradient vectors

1106 — Transmit gradient vectors

1200

1201    Transmit validation model

1202    Receive gradient vectors

1203    Cluster clients

1204    Transmit clustering data

MACHINE LEARNING MODEL DISTRIBUTION

CROSS REFERENCE TO RELATED APPLICATION

This patent application is a U.S. National Stage application of International Patent Application Number PCT/EP2022/052714 filed Feb. 4, 2022, which is hereby incorporated by reference in its entirety, and claims priority to FI 20215150 filed Feb. 15, 2021.

TECHNICAL FIELD

The present application generally relates to the field of wireless communications. In particular, the present application relates to a client device and a centralised unit device, and related methods and computer programs.

BACKGROUND

Machine learning (ML) may be used in future telecommunication networks for, for example, network optimisation and automation. For a global implementation of an ML model, the network should collect relatively large amounts of features and data in order to effectively model different radio environments, RAN configurations, user types, etc. This increases the complexity of the hyperparameters in the model. A complex model would converge slowly to the optimal state or it would require large amount of data and iterations to optimize the parameters. This also increases the amount and frequency of radio measurements in different network entities. Moreover, signalling of the measured data between network entities increases the load in control channel. Furthermore, the inference time is also increased by the model complexity, which introduces extra delay in making decisions.

SUMMARY

The scope of protection sought for various example embodiments of the invention are set out by the independent claims. The example embodiments and features, if any, described in this specification that do not fall under the scope of the independent claims are to be interpreted as examples useful for understanding various example embodiments of the invention.

An example embodiment of a client device comprises at least one processor and at least one memory comprising computer program code. The at least one memory and the computer program code are configured to, with the at least one processor, cause the client device to: receive a validation model from a centralised unit device, wherein the validation model comprises a machine learning model configured to predict an output from an input based on a plurality of model parameters; collect radio measurements corresponding to the input of the validation model and parameters corresponding to the output of the validation model; obtain predicted parameters as the output of the validation model by feeding the collected radio measurements as the input into the validation model; compare the collected parameters and the predicted parameters; compute a plurality of gradient vectors for the plurality of model parameters of the validation model based on the comparison between the collected parameters and the predicted parameters; and transmit the plurality of gradient vectors for the plurality of model parameters of the validation model to the centralised unit device. The client device may, for example, enable the centralised unit device to find an ML model applicable to the client device.

An example embodiment of a client device comprises means for performing: receive a validation model from a centralised unit device, wherein the validation model comprises a machine learning model configured to predict an output from an input based on a plurality of model parameters; collect radio measurements corresponding to the input of the validation model and parameters corresponding to the output of the validation model; obtain predicted parameters as the output of the validation model by feeding the collected radio measurements as the input into the validation model; compare the collected parameters and the predicted parameters; compute a plurality of gradient vectors for the plurality of model parameters of the validation model based on the comparison between the collected parameters and the predicted parameters; and transmit the plurality of gradient vectors for the plurality of model parameters of the validation model to the centralised unit device.

In an example embodiment, alternatively or in addition to the above-described example embodiments, the input of the validation model corresponds to radio measurements and the output of the validation model corresponds to quality of service parameters. The client device may, for example, utilise ML models for predicting quality of service parameters.

In an example embodiment, alternatively or in addition to the above-described example embodiments, the radio measurements comprises at least one of: reference signal received power, channel state information, or buffer status report, and/or wherein the quality of service parameters comprises at least one of: delay, error probability, or data rate. The client device may, for example, utilise ML models for predicting delay, error probability, and/or data rate.

In an example embodiment, alternatively or in addition to the above-described example embodiments, the at least one memory and the computer program code are further configured to, with the at least one processor, cause the client device to compare the collected parameters and the predicted parameters by calculating a loss between the collected parameters and predicted parameters using a loss function indicated by the centralised unit device. The client device may, for example, efficiently compare the compare the collected parameters and the predicted parameters.

In an example embodiment, alternatively or in addition to the above-described example embodiments, wherein the at least one memory and the computer program code are further configured to, with the at least one processor, cause the client device to: receive a cluster model from a centralised unit device, wherein the cluster model comprises a machine learning model configured to predict an output from an input based on a plurality of model parameters; collect radio measurements corresponding to the input of the cluster model and parameters corresponding to the output of the cluster model; obtain predicted parameters as the output of the cluster model by feeding the collected radio measurements as the input into the cluster model; compare the collected parameters and the predicted parameters; compute a plurality of gradient vectors for the plurality of model parameters of the cluster model based on the comparison between the collected parameters and the predicted parameters; and update the plurality of parameters of the cluster model based on the gradient vectors for the plurality of model parameters of the cluster model. The client device may, for example, efficiently obtain a ML model applicable to the environment of the client device.

In an example embodiment, alternatively or in addition to the above-described example embodiments, the at least one memory and the computer program code are further configured to, with the at least one processor, cause the client device to: transmit the plurality of model parameters of the cluster model to the centralised unit device. The client device may, for example, enable the centralised unit device to improve the cluster model based on parameters obtained from different client devices in a cluster.

In an example embodiment, alternatively or in addition to the above-described example embodiments, the at least one memory and the computer program code are further configured to, with the at least one processor, cause the client device to use the cluster model, and/or the updated cluster model for data transmission. The client device may, for example, efficiently predict parameters needed for packet transmission using the cluster model.

An example embodiment of a centralised unit device comprises at least one processor and at least one memory comprising computer program code. The at least one memory and the computer program code are configured to, with the at least one processor, cause the centralised unit device to: transmit a validation model to a plurality of client devices, wherein the validation model comprises a machine learning model configured to predict an output from an input based on a plurality of model parameters; receive a plurality of gradient vectors for the plurality of model parameters of the validation model from each client device in the plurality of client devices; cluster the plurality of client devices based on the plurality of gradient vectors, wherein the clustering groups client devices with similar gradient vectors into one cluster; and transmit clustering data to at least one distributed unit device, wherein the clustering data indicates the clustering of client devices connected to the at least one distributed unit device. The centralised unit device may, for example, find an ML model applicable to each client device.

An example embodiment of a centralised unit device comprises means for performing: transmit a validation model to a plurality of client devices, wherein the validation model comprises a machine learning model configured to predict an output from an input based on a plurality of model parameters; receive a plurality of gradient vectors for the plurality of model parameters of the validation model from each client device in the plurality of client devices; cluster the plurality of client devices based on the plurality of gradient vectors, wherein the clustering groups client devices with similar gradient vectors into one cluster; and transmit clustering data to at least one distributed unit device, wherein the clustering data indicates the clustering of client devices connected to the at least one distributed unit device.

In an example embodiment, alternatively or in addition to the above-described example embodiments, the at least one memory and the computer program code are further configured to, with the at least one processor, cause the centralised unit device to cluster the plurality of client devices based on the plurality of gradient vectors by performing: compute a pairwise gradient similarity for each client device pair in the plurality of client devices; and assign each client device in the plurality of client devices to a cluster that maximises the pairwise gradient similarity between the client device and client devices in the cluster. The centralised unit device may, for example, efficiently cluster the client devices.

In an example embodiment, alternatively or in addition to the above-described example embodiments, the at least one memory and the computer program code are further configured to, with the at least one processor, cause the centralised unit device to: generate a cluster model for each cluster based on the gradient vectors received from the client devices in the cluster, wherein the cluster model comprises a machine learning model configured to predict an output from an input based on a plurality of model parameters; and transmit the cluster model of each cluster to the client devices in the cluster. The centralised unit device may, for example, efficiently obtain an ML model that is applicable to each client device in a cluster.

In an example embodiment, alternatively or in addition to the above-described example embodiments, the at least one memory and the computer program code are further configured to, with the at least one processor, cause the centralised unit device to: receive a plurality of model parameters of a cluster model from each client device in the cluster; update the plurality of parameters of the cluster model based on the received model parameters from the client devices in the cluster; and transmit the updated model parameters of the cluster model to the client devices in the cluster. The centralised unit device may, for example, efficiently update the cluster model in each device base on parameters obtained form other client devices in the cluster.

In an example embodiment, alternatively or in addition to the above-described example embodiments, the at least one memory and the computer program code are further configured to, with the at least one processor, cause the centralised unit device to: update the parameters of the validation model based on the received gradient vectors; and transmit the updated parameters of the validation model to the plurality of client devices. The centralised unit device may, for example, efficiently update the validation model based on the gradient vectors obtained from each client device.

An example embodiment of a method comprises: receiving a validation model from a centralised unit device, wherein the validation model comprises a machine learning model configured to predict an output from an input based on a plurality of model parameters; collecting radio measurements corresponding to the input of the validation model and parameters corresponding to the output of the validation model; obtaining predicted parameters as the output of the validation model by feeding the collected radio measurements as the input into the validation model; comparing the collected parameters and the predicted parameters; computing a plurality of gradient vectors for the plurality of model parameters of the validation model based on the comparison between the collected parameters and the predicted parameters; and transmitting the plurality of gradient vectors for the plurality of model parameters of the validation model to the centralised unit device.

An example embodiment of a computer program product comprises program code configured to perform the method according to any of the above client device related example embodiments, when the computer program product is executed on a computer.

An example embodiment of a method comprises: transmitting a validation model to a plurality of client devices, wherein the validation model comprises a machine learning model configured to predict an output from an input based on a plurality of model parameters; receiving a plurality of gradient vectors for the plurality of model parameters of the validation model from each client device in the plurality of client devices; clustering the plurality of client devices based on the plurality of gradient vectors, wherein the clustering groups client devices with similar gradient vectors into one cluster; and transmitting clustering data to at least one distributed unit device, wherein the clustering data indicates the clustering of client devices connected to the at least one distributed unit device.

An example embodiment of a computer program product comprises program code configured to perform the method according to any of the above centralised unit device related example embodiments, when the computer program product is executed on a computer.

DESCRIPTION OF THE DRAWINGS

The accompanying drawings, which are included to provide a further understanding of the example embodiments and constitute a part of this specification, illustrate example embodiments and together with the description help to explain the principles of the example embodiments. In the drawings.

Like reference numerals are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present disclosure may be constructed or utilized. The description sets forth the functions of the example and the sequence of steps for constructing and operating the example. However, the same or equivalent functions and sequences may be accomplished by different example embodiments.

Figure 1:
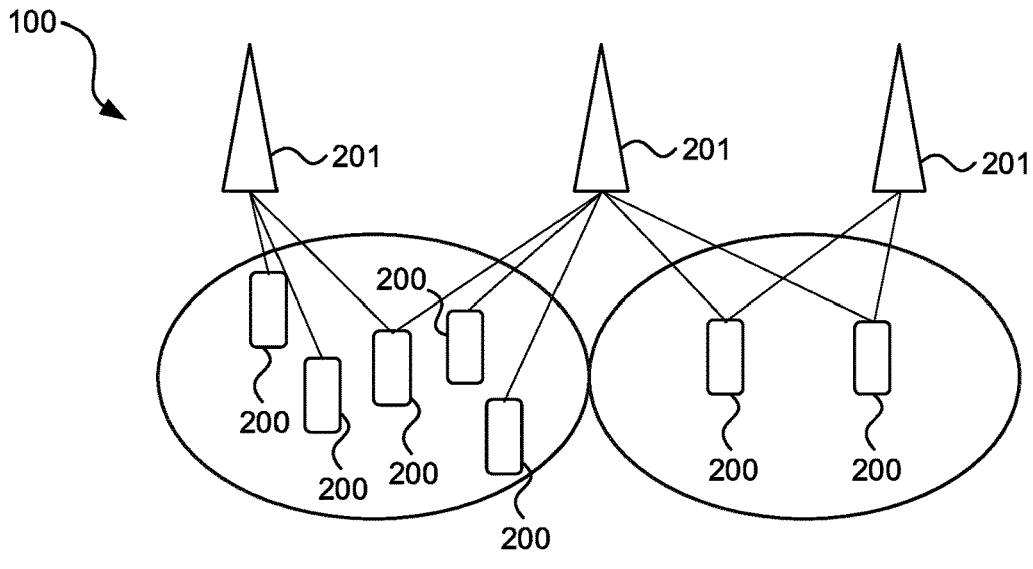
FIG. 1 shows an example embodiment of the subject matter described herein illustrating an example system in which various example embodiments of the present disclosure may be implemented.

FIG. 1 illustrates an example system 100 in which various example embodiments of the present disclosure may be implemented. An example representation of the system 100 is shown depicting a plurality of client device 200 and a plurality of base stations 201.

It may be challenging to enable on-broad ML inference in client devices 200. The client device 200 needs to obtain the updated ML model and intermediate output based on the task and environment. Further, ML applications in a Radio Access Network (RAN) require timely decisions. For example, scheduling a packet by allocating resource blocks is typically operated at transmission time interval (TTI) levels of milliseconds. If the client device 200 requests the decisions from other network entities, such as a base station 201, extra delay and signalling load are introduced over the control channel. Thus, it may be beneficial to transfer pretrained ML model parameters from the network to client devices 200 for execution. However, the dataset in RAN applications can be sensitive to the dynamics of radio environment reported by the client device 200. Thus, the ML model should be optimised based on timely environment changes in order to provide effective decisions.

For a global implementation of an ML model, the network should collect relatively large amounts of features and data in order to effectively model different radio environment, RAN configurations, user types, etc. This increases the complexity of the hyperparameters in the model, thus it may be difficult to find the convex hypersurface. A complex model would converge slowly to the optimal state, or it would require large amount of data and iterations to optimize the parameters. This also increases the amount and frequency of radio measurements in different network entities, which can be ineffective for battery and memory constrained 5G terminals. Moreover, signalling of the measured data between network entities increases the load in control channel. Furthermore, the inference time is also increased by the model complexity, which introduces extra delay in making decisions related to, for example, for packet transmission.

Another challenge is how to train a global ML model across a network in the case of one ML model will be used in global scenarios rather than only used in a local scenario. In order to achieve this, the ML model should be able to differentiate the radio environment. One approach could be to model the environment with human knowledge. For example, in the physical layer, one can use received signal strength, interference, modulation and coding scheme, and channel bandwidth to predict the channel capacity. However, in the higher layers protocols such features are very complex to model. For instance, the split, aggregation, retransmission, sequencing of packets at different layers, has impacts to the packet delay, throughput, success probability. Furthermore, to obtain the data of all of these features can require multiple network entities to report the measurements at the same time scale, which may not be realistic. The amount of measurement reports and the complexity of training the model is probably not suitable for timely decisions in RAN applications.

For a distributed implementation (i.e. at client devices 200, such as 5G terminals), the ML model can have poor generalization for the radio environment. This is because the data used to train the model is within a specific scenario around each client device 200. For example, the optimal transmit power can change according to the propagation loss, interference, resource amount, etc. Collecting enough data samples for these features can require a longer time than the global model. Moreover, as the client device 200 is experiencing different scenario when moving around, the model is difficult to a stationary decision, and quickly adapt to the environment changes. Furthermore, training a complex model at the client device 200 can also consume significant amounts of power and memory.

In the example use case of multi-connectivity, an accurate prediction of received signal and traffic load at difference cells is difficult to achieve by a global ML model. For example, the propagation distribution changes according to the building blocks, multipath transmission, Doppler effect, etc. It is difficult to capture the impact of different factors using a classical channel model. Similar problem also persists in traffic prediction, where the client devices with different type of services, such as internet of things (IoT), vehicle-to-everything (V2X), extended reality (XR), could have significantly different packet arrival distribution, data size, session length, etc. Furthermore, it is difficult to find a correlation between the received signal, channel state, and traffic load and the packet delay, reliability, and throughput based on a mathematical model from ML. For example, it is hard to quantify the impact of different scheduling schemes over the packet delay unless a large amount of data samples is used, which may not be realistic in practice.

In order to reduce the cost of building a ML model with large feature sets while providing accurate results to client devices 200 in dynamic environments, it may be beneficial to enable the system to automatically identify the environment differences from the observed data, and apply with a well configured ML model. This can also avoid retraining of the ML model when the client device 200 is frequently moving in different scenarios. The example embodiments disclosed herein can intelligently train, apply different model parameters and coordinate multiple client devices to adapt the radio environment and configurations without introducing extra measurements.

The client device 200 may comprise, for example, a mobile phone, a smartphone, a tablet computer, a smart watch, or any hand-held or portable device or any other apparatus, such as a vehicle, a robot, or a repeater. The client device 200 may also be referred to as a user equipment (UE). The client device 200 may communicate with the centralised unit device 300 via e.g. an air/space born vehicle communication connection, such as a service link.

Some terminology used herein may follow the naming scheme of 4G or 5G technology in its current form. However, this terminology should not be considered limiting, and the terminology may change over time. Thus, the following discussion regarding any example embodiment may also apply to other technologies, such as 6G.

Figure 2:
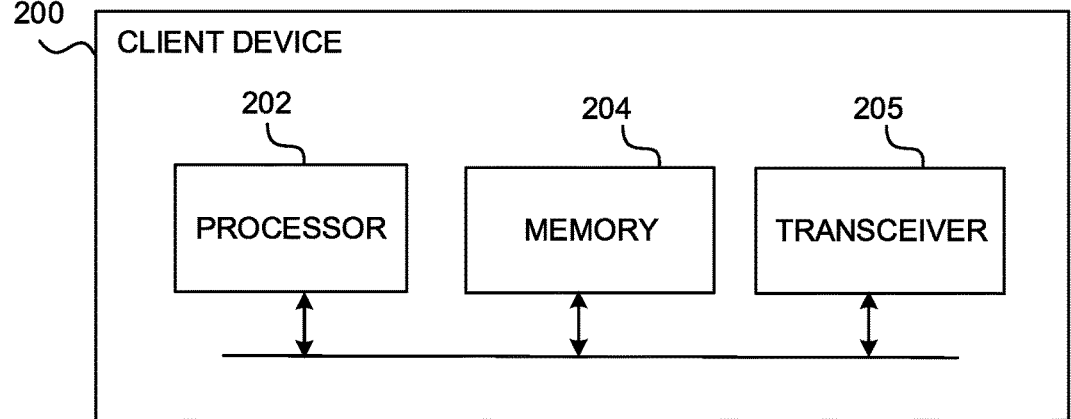
FIG. 2 shows an example embodiment of the subject matter described herein illustrating a client device.

FIG. 2 is a block diagram of a client device 200 in accordance with an example embodiment.

The client device 200 comprises one or more processors 202, and one or more memories 204 that comprise computer program code. The client device 200 may also comprise a transceiver 205, as well as other elements, such as an input/output module (not shown in FIG. 2), and/or a communication interface (not shown in FIG. 2).

According to an example embodiment, the at least one memory 204 and the computer program code are configured to, with the at least one processor 202, cause the client device 200 to receive a validation model from a centralised unit device, wherein the validation model comprises a machine learning model configured to predict an output from an input based on a plurality of model parameters.

The input and output may correspond to any data that the client device 200 may use to, for example, make decisions related to packet transmission.

Herein, transmitting or receiving an ML model, such as the validation model, may refer to transmitting or receiving any data based on which the recipient can use the ML. For example, if the recipient, such as the client device 200, already knows the structure of the ML model, such as the structure of a neural network, it may suffice to transmit parameters of the ML model.

The client device 200 may be further configured to collect radio measurements corresponding to the input of the validation model and parameters corresponding to the output of the validation model.

The client device 200 may be further configured to obtain predicted parameters as the output of the validation model by feeding the collected radio measurements as the input into the validation model.

The procedure of inputting data into an ML model and, as a result, obtaining the output may also be referred to as inference.

The client device 200 may be further configured to compare the collected parameters and the predicted parameters.

Based on the comparison, the client device 200 can assess how well the validation model predicted the correct output.

The client device 200 may be further configured to compute a plurality of gradient vectors for the plurality of model parameters of the validation model based on the comparison between the collected parameters and the predicted parameters.

The gradient vectors can indicate how the model parameters should be changed to improve the prediction provided by the validation model.

The client device 200 may be further configured to transmit the plurality of gradient vectors for the plurality of model parameters of the validation model to the centralised unit device.

According to an example embodiment, the input of the validation model corresponds to radio measurements and the output of the validation model corresponds to quality of service parameters. For example, the radio measurements may comprise at least one of: reference signal received power, channel state information, or buffer status report, and/or the quality of service parameters may comprise at least one of: delay, error probability, or data rate.

Although the client device 200 may be depicted to comprise only one processor 202, the client device 200 may comprise more processors. In an example embodiment, the memory 204 is capable of storing instructions, such as an operating system and/or various applications.

Furthermore, the processor 202 is capable of executing the stored instructions. In an example embodiment, the processor 202 may be embodied as a multicore processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 202 may be configured to execute hard-coded functionality. In an example embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (program-mable ROM), EPROM (erasable PROM), flash ROM, RAM (random access memory), etc.).

The client device 200 may be any of various types of devices used by an end user entity and capable of communication in a wireless network, such as user equipment (UE). Such devices include but are not limited to smartphones, tablet computers, smart watches, lap top computers, Internet-of-Things (IoT) devices, etc.

Figure 3:
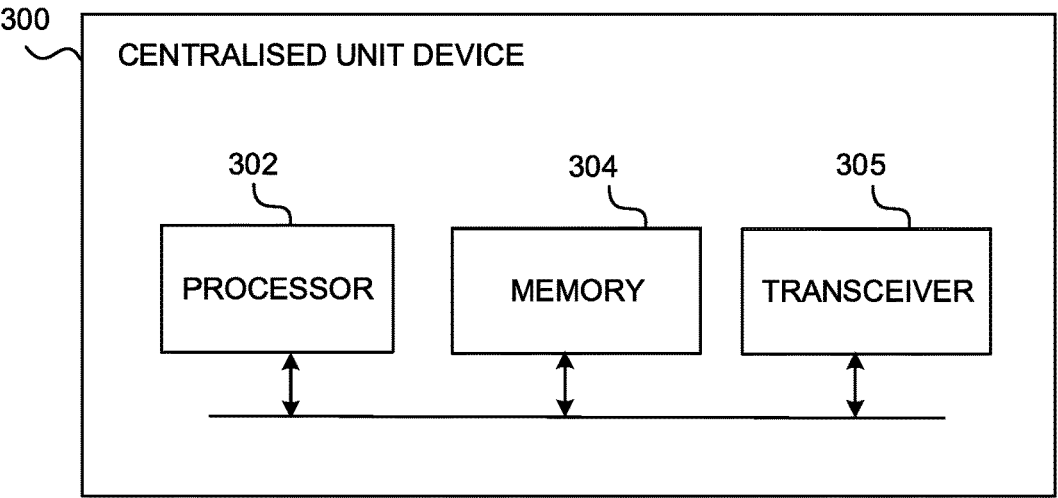
FIG. 3 shows an example embodiment of the subject matter described herein illustrating a centralised unit device.

FIG. 3 is a block diagram of a centralised unit device 300 in accordance with an example embodiment.

The centralised unit device 300 comprises one or more processors 302, and one or more memories 304 that comprise computer program code. The centralised unit device 300 may also comprise a transceiver 305, as well as other elements, such as an input/output module (not shown in FIG. 3), and/or a communication interface (not shown in FIG. 3).

The centralised unit device 300 may also be referred to as a centralised unit, CU, CU device, or similar.

The centralised unit device 300 may be any device/ module/node in a network that is configured to perform at least some of the functionality as disclosed herein. For example, the CU device 300 may be part of a base station 201, such as a gNB. For example, in 5G a base station 201 may be implemented using a so-called centralised unit-distributed unit (CU-DU) architecture. In such an architecture, the CU can support service data adaptation (SDAP), radio resource control RRC), and packet data convergence protocol (PDCP) layers, while the DU can support radio link control (RLC), media access control (MAC), and Physical Layer. One CU can belong to multiple gNB and multiple DUs can be connected to one CU.

According to an example embodiment, the at least one memory 304 and the computer program code are configured to, with the at least one processor 302, cause the centralised unit device 300 to transmit a validation model to a plurality of client devices, wherein the validation model comprises a machine learning model configured to predict an output from an input based on a plurality of model parameters.

The centralised unit device 300 may be further configured to receive a plurality of gradient vectors for the plurality of model parameters of the validation model from each client device in the plurality of client devices.

The centralised unit device 300 may be further configured to cluster the plurality of client devices based on the plurality of gradient vectors, wherein the clustering groups client devices with similar gradient vectors into one cluster.

The centralised unit device 300 may be further configured to transmit clustering data to at least one distributed unit device, wherein the clustering data indicates the clustering of client devices connected to the at least one distributed unit device.

Although the centralised unit device 300 is depicted to comprise only one processor 302, the centralised unit device 300 may comprise more processors. In an example embodiment, the memory 304 is capable of storing instructions, such as an operating system and/or various applications.

Furthermore, the processor 302 is capable of executing the stored instructions. In an example embodiment, the processor 302 may be embodied as a multicore processor, a single core processor, or a combination of one or more multi-core processors and one or more single core processors. For example, the processor 302 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

In an example embodiment, the processor 302 may be configured to execute hard-coded functionality. In an example embodiment, the processor 302 is embodied as an executor of software instructions, wherein the instructions may specifically configure the processor 302 to perform the algorithms and/or operations described herein when the instructions are executed.

The memory 304 may be embodied as one or more volatile memory devices, one or more non-volatile memory devices, and/or a combination of one or more volatile memory devices and non-volatile memory devices. For example, the memory 304 may be embodied as semiconductor memories (such as mask ROM, PROM (program-mable ROM), EPROM (erasable PROM), flash ROM, RAM (random access memory), etc.).

Further features of the centralised unit device 300 directly result from the functionalities and parameters of the client device 200.

The centralised unit device 300 can estimate the similarity of client data distributions, and dynamically cluster the client devices 200 for training without introducing extra measurements or signalling of radio data. This is achieved by implementing a general validation model for all client devices 200 to compute the parameter gradients based on a generic loss function from their local observed data. The client devices 200 with sufficiently large similarities of their gradient vectors can be allocated within a cluster model for coordinated training.

The clustered client devices 200 can be changed according to the variation of gradients similarities. For example, if a client device moved to an area with a different radio environment (i.e. propagation loss distribution), the client device 200 can be assigned to a new cluster model.

The validation model can be updated in the network by collecting the gradient vectors from a plurality of client devices 200 computed by the loss function of a batch of samples. The clustered models can be updated independently in each client device 200 and synchronized periodically to ensure effective generalization for each cluster's environment.

The client device 200 and the centralised unit device 300 can solve the problem of how to find the best granularity in enabling multiple client devices 200 sharing common ML model parameters, from effective split of sampled radio data based on their similarity of distributions, to improve the model accuracy and generalization to different radio scenarios. For example, the problem occurs when a client device 200 is in different propagation environments, or with different moving speeds. The solution allows the centralised unit device 300 to identify these differences from the converging direction of the model parameters.

Figures 4, 5:
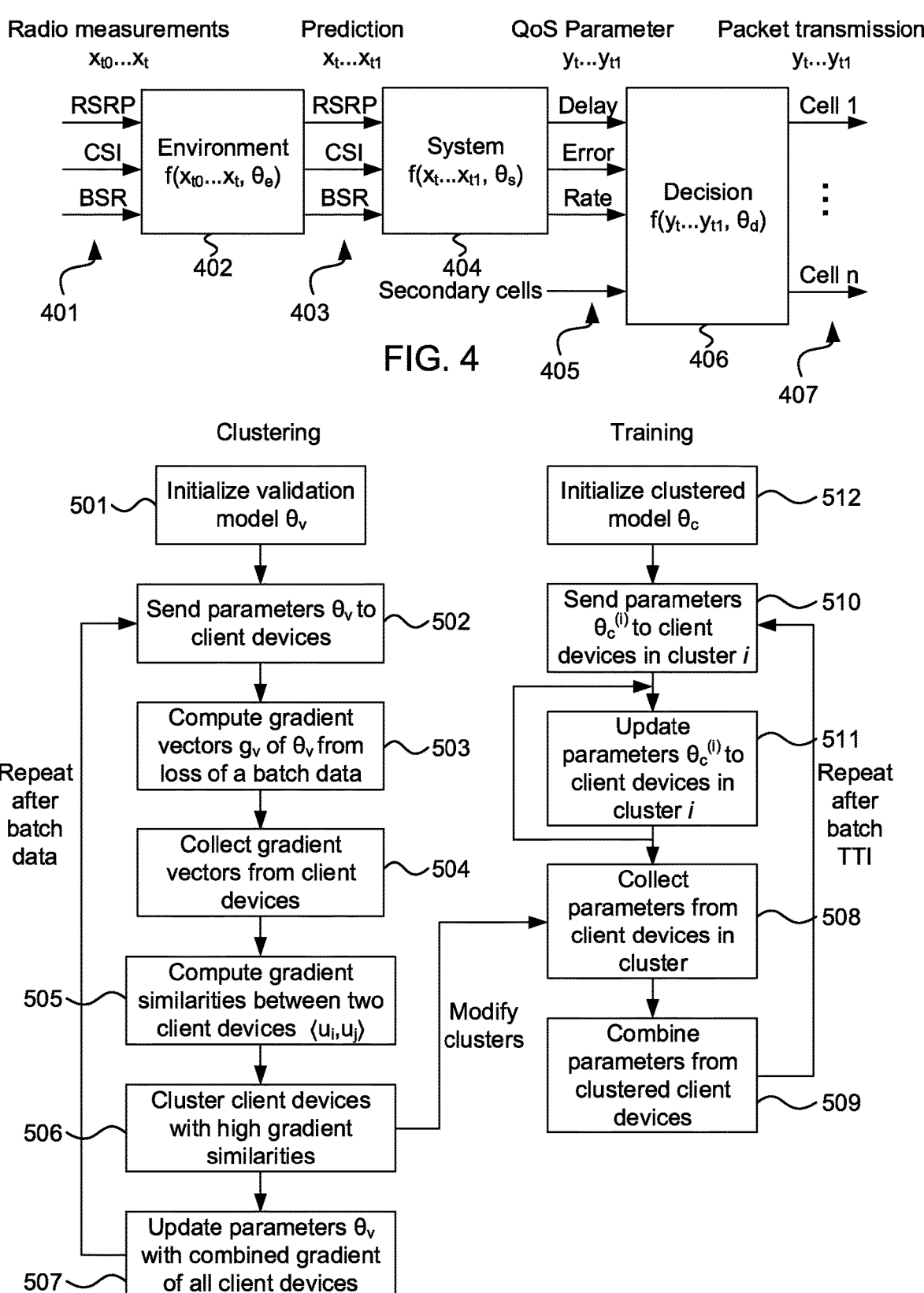
FIG. 4 shows an example embodiment of the subject matter described herein illustrating ML model data flow.
FIG. 5 shows an example embodiment of the subject matter described herein illustrating a flow chart for machine learning model distribution.

FIG. 4 shows an example embodiment of the subject matter described herein illustrating ML model data flow.

For clarity, an example embodiment is disclosed considering the model illustrated in FIG. 4 for the use case of link quality prediction in multi-connectivity. In uplink grant-free transmission, the Ultra-Reliable Low-Latency Communication (URLLC) client devices 200 can select multiple cells to send a data packet. The objective is to effectively predict the QoS (delay, error probability, data rate) of each link from the radio measurements (RSRP, channel, buffer status), and select the best cells satisfying the QoS target of the client device 200.

The client device 200 may perform the prediction at a time instant t. The client device 200 can collect the radio measurements 401, such as RSRP, CSI, and BSR, in the past $t_0$ TTIs and predict the values of the radio measurements 403 in the future $t_1$ TTIs based on a neural network function 402 of parameter $\theta_e$.

The client device 200 can use the predicted radio parameters 403 to predict QoS parameters 405, such as packet delay, error probability, and data rate, based on a neural network function 404 of parameter $\theta_s$. The client device 200 can use the model $\theta_e$, $\theta_s$ over all connected cells, and generated probabilities of packet transmission over each from the predicted QoS 405. Based on the predicted QoS parameters 405, the client device can make decisions related to packet transmissions 407 using a decision function 406.

An objective is to identify client device reported data set x and y under the same distribution and make the model $\theta_e$ and $\theta_s$ converge to a similar direction. In this context, the client devices 200 in the same radio environment and traffic pattern should share the parameter $\theta_e$, and the client devices with the same RAN parameter configuration should share the parameter $\theta_s$.

FIG. 5 shows an example embodiment of the subject matter described herein illustrating a flow chart for ML model distribution.

The CU 300 can initialise 501 a validation model with parameter matrix $\theta_v$, that is capable to predict y, such as Delay, Error Rate, and/or Transmission Rate, from a sequence of x, such as RSRP, CSI, and/or BSR. The CU 300 can then broadcast 502 $\theta_v$, and an indication of a loss function L, and indicate the batch size of validation samples to client device 200.

Each client device 200 can compute 503 a gradient vector $g_v$ of the parameters $\theta_v$ based on the loss of observed y and predicted $P(y'|x,\theta_v)$ from a fixed batch of local x, and send $g_v$ to the CU 300.

The CU 300 can collect 504 the gradient vectors from the client devices 200. Once all client devices 200 report $g_v$, the CU 300 can compute 505 the pairwise gradient similarities for each pair of client devices 200. The CU 300 can then perform clustering 506 of the client devices 200 to maximize the similarity between client devices in each cluster. The CU 300 can transmit the cluster labels to each DU.

For example, given gradient $g_v{}^i$ of client device j and gradient $g_v{}^j$ of client device j, the CU 300 can compute the cosine similarity $$s\langle u_i, u_j \rangle = \frac{g_v^i \cdot g_v^j}{\left\| g_v^i \right\| \left\| g_v^j \right\|}$$

and assign k-th client device $u_k$ to cluster c=argmax$_{i \in c}$s $\langle u_k, u_i \rangle$ .

The CU 300 can initialise 512 a cluster model and transmit the cluster model to each client device 200 in a cluster.

The CU 300 can perform coordinative model updates on, for example, every periodical TTIs until new clusters are indicated. The can CU 300 collect 508 the parameters used to make packet transmission decisions from the client devices 200 in a cluster (noted as cluster model $\theta_c$), and the number of training samples t. The CU 300 can then aggregate 509 the parameters of $\theta_c{}^i$ from each client device i by weighting with sample numbers $t^i/t$, generate a new clustered model $\theta_c$, and transmit 510 it to each DU (scheduled) or client device (grant-free).

DU (scheduled) or UE (grant-free) can use $\theta_c$ to make transmission decisions and update 511 the model based on locally observed x and y until the loss is minimized.

The CU 300 can update 507 the validation model parameters $\theta_v$ based on aggregated gradients of all client devices 200 and signal the new $\theta_v$ to each client device 200.

The validation model can be updated based on an equal amount of data samples from all client devices 200, which can ensure that the gradient similarities are not biased by unbalanced data size on each client device 200 during a fixed gap of TTIs. On the contrary, the cluster model can be updated locally on each client device 200 and aggregated periodically, which can ensure timely optimization for the decisions. Only the aggregation criterion may need to be changed when the client device 200 is assigned to different clusters.

The CU 300 and the client devices 200 should cache two sets of model parameters. The network should indicate to the client device different criteria of updating the models, and the client device 200 should report the gradients or parameters to the network.

Figure 6:
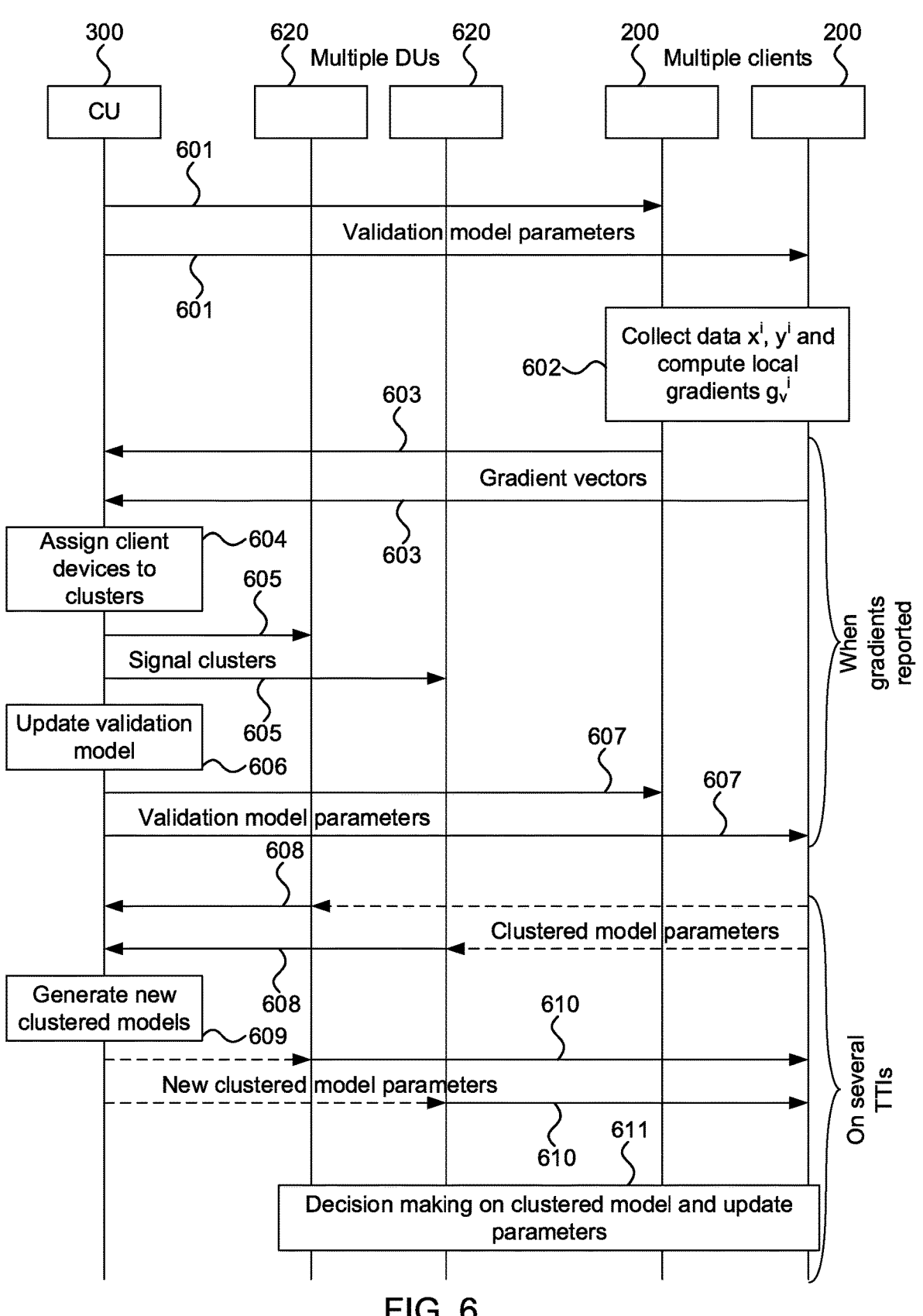
FIG. 6 shows an example embodiment of the subject matter described herein illustrating a signalling diagram.

FIG. 6 shows an example embodiment of the subject matter described herein illustrating a signalling diagram.

The CU 300 can transmit the validation model 601 to client devices 200. The validation model can indicate necessary radio measurements, such as RSRP, channel state information, and traffic load, and QoS parameters, such as delay, error probability, and throughput.

The client devices 200 can collect 602 a batch of radio measurements and QoS parameters from packet transmissions. The client devices 200 can then compute the gradients of the validation model parameters based on a loss function of the model predicted and observed QoS.

According to an example embodiment, the client device 200 is configured to compare the collected parameters and the predicted parameters by calculating a loss between the collected parameters and predicted parameters using a loss function indicated by the centralised unit device 300.

The client devices can report the gradient vectors 603 to the CU 300.

The CU 300 can receive the gradient vectors 603 from each client device 200 and compute the pairwise gradient similarities for each pair of client devices 200.

The CU 300 can then perform clustering 604 of the client devices 200 to maximize the average pairwise similarity.

According to an example embodiment, the centralised unit device 300 is configured to compute a pairwise gradient similarity for each client device pair in the plurality of client devices and assign each client device in the plurality of client devices to a cluster that maximises the pairwise gradient similarity between the client device and client devices in the cluster.

The CU 300 may transmit indication of the clusters 605, such as cluster labels, to the gNBs/DUs 620 to which the client devices 200 are connected. The indication of the clusters 605 may be referred to as clustering data. The gNB/DU 620 can then coordinates the connected client devices 200 to share cluster models for data transmission.

According to an example embodiment, the CU device 300 is further configured to update 606 the parameters of the validation model based on the received gradient vectors 603 and transmit the updated parameters of the validation model 607 to the plurality of client devices.

The CU 300 can update 606 the validation model based on the gradient vectors 603 received from the client devices 200. The CU 300 may then transmit the updated validation model parameters 607 to the client devices 200.

According to an example embodiment, the client device 200 is further configured to receive a cluster model from a centralised unit device 300, wherein the cluster model comprises a machine learning model configured to predict an output from an input based on a plurality of model parameters.

Herein a cluster model may refer to any ML model that is applicable to client devices in a cluster formed by the CU 300. A cluster model may also be referred to as clustered model or similar.

The client device 200 may collect radio measurements corresponding to the input of the cluster model and parameters corresponding to the output of the cluster model.

The client device 200 may obtain predicted parameters as the output of the cluster model by feeding the collected radio measurements as the input into the cluster model and compare the collected parameters and the predicted parameters.

The client device 200 may compute a plurality of gradient vectors for the plurality of model parameters of the cluster model based on the comparison between the collected parameters and the predicted parameters.

The client device 200 may update the plurality of parameters of the cluster model based on the gradient vectors for the plurality of model parameters of the cluster model.

According to an example embodiment, the client device 200 is further configured to transmit the plurality of model parameters 608 of the cluster model to the centralised unit device 300.

According to an example embodiment, the centralised unit device 300 is further configured to generate a cluster model for each cluster based on the gradient vectors received from the client devices in the cluster, wherein the cluster model comprises a machine learning model configured to predict an output from an input based on a plurality of model parameters. The CU device 300 may then transmit the cluster model of each cluster to the client devices in the cluster.

The CU 300 can collect the cluster model parameters 608 from the client devices 300 in a cluster. The CU 300 can then generate 609 a new cluster model for each cluster and transmit the updated parameters 610 to the client devices 200, for example, periodically until a new cluster indicated by the network.

According to an example embodiment, the CU device 300 is further configured to receive a plurality of model parameters 608 of a cluster model from each client device in the cluster, update the plurality of parameters of the cluster model based on the received model parameters from the client devices in the cluster, and transmit the updated model parameters 610 of the cluster model to the client devices in the cluster. The CU 300 can also update the validation model parameters by aggregating the gradients of all client devices 200 and transmit the updated parameters to all client devices 200.

The client device 200 may make decisions based on the cluster model and update parameters 611.

According to an example embodiment, the client device 200 is further configured to use the cluster model, and/or the updated cluster model for data transmission.

The proposed solution is general for ML-based solutions with distributed learners. However, for clarity, some example embodiments are disclosed in relation to the use case of packet transmission in multi-connectivity. In this context, the client devices 200 can use the cluster model to predict the RSRP, channel state, traffic load and estimation the link quality at different cells for packet transmission.

At least some example embodiments can also be used in other levels of global and local model scenarios. For example, in other use cases, the validation model can be managed by the Network Data Analytics Function (NWDAF) to cluster the gNBs based on their reported data and assign them with different shared models.

In the following, an example embodiment is provided for the use case of packet transmission in multiconnectivity. The combined model $\theta_e$ and $\theta_s$ predicts the delay, error, and rate when transmitting packet on a link under the given RSRP, CSI, and BSR during the past $t_0$ TTIs.

To measure the gradient similarities of every pair of client devices 200, the cosine distance of the validation models' gradients is computed over all kernels and bias. An example clustering algorithm of Density-based Spatial Clustering (DBSCAN) is used to split the client devices 200 into clusters and apply with separated model aggregation criteria. The algorithm procedure is disclosed as follows.

1. Initialize a graph with random parameters $\theta_e$ and $\theta_s$, which has the following relationship:

$$-(x_{t+1} \ldots x_{t+t_1})=f(x_{t-1} \ldots x_{t-t_0},\theta_e)y_{t+t_1}=f(x_{t+1} \ldots x_{t+t_1},\theta_s)$$

$x_i$: RSRP (downlink signal), CSI (estimated BLER), BSR (UE buffered bytes)

$y_i$: Delay (received PDU), Error (PER), Rate (channel throughput)

2. Each client device 200 computes the gradient of the validation model based on local data and reports to network Measures x on every TTI over each connected cell, when a packet arrives in buffer (at time t), feed $$\left(x_{t-1} \ \cdots \ x_{t-t_0}\right)_{c_1 \ldots c_n}$$

to compute $$\left(y_{t+t_1}\right)_{c_1 \ldots c_n},$$

send packet on cells $c_i$ that satisfy its requirements of $\tilde{y}$
Measures $$\left(y'_{t+t_1}\right)_{c_i}$$

after receiving ACKs from DU, repeat for k packets to obtain vectors of $x_t$, $y_{t+t_1}$, $y_{t+t_1}'$, compute the average gradients over all parameters in $\theta_e$, $\theta_s$ to get a vector $$g_{u_j} = \frac{1}{k}\sum_{i=1}^{k} \frac{d\langle(f(x_{t-1} \ \cdots \ x_{t-t_0}, \theta))^i - (y_{t+1})^i\rangle}{d\theta_{u_j}}$$

3. CU 300 clusters the client devices 200 based on gradient similarities and send the labels to DUs Collects $g_{u_j}$ from all the client devices 200 (in different TTIs depending on packet arrivals), computes cosine distance of every two client devices 200 to get a similarity vector $$D_c(u_i, u_j) = 1 - \frac{g_{u_i} g_{u_j}}{\left\| g_{u_i} \right\|_2 \left\| g_{u_j} \right\|_2}$$

performs clustering of client devices 200 by labelling them within minimum distance, send labels to gNB:

loop over all client devices 200 from any cluster: $u_i \in u$ & $u_i \notin c$:

find neighbours $n \leftarrow u_k$ over minimum distance $\varepsilon$: $D_c(u_k, u_i) < \varepsilon$, $\forall u_k \in u$ if neighbour client devices 200 larger than minimum size: $|n| \geq N$, assign a cluster label to client devices 200 in n: $c_i \leftarrow$—n if a client device 200 out of any cluster $u_i \notin c$, assign $c_j \leftarrow u_j$ 4. CU 300 collects parameters $\theta$ and sample number n from each DU or client devices 200 on every T TTIs, aggregate the parameters of client devices 200 in each cluster and assign to each DU or client device 200:

$$-\theta_{c_i} = \sum_{u_j \in c_i} \frac{n_{u_j}}{n} \theta_{u_j}$$

(clustered model, updated every T TTIs)

DU or client device 200 uses $\theta_{c_i}$ to select cells to transmit packets and update locally until T TTIs 5. CU 300 updates parameters $\theta$ based on average gradients of all UEs and assign to each:

$$-\theta = \theta - \frac{1}{m} \sum_{i=1}^{m} g_{\theta_{u_i}}$$

(validation model, updated every k packets)

DU or client device 200 uses $\theta$ to compute gradients over every k packets and report to CU 300

In the following, results are presented for simulations using a system-level simulator in the heterogeneous network scenario, where each client device 200 is connected to four best cells. The used parameters are: 10 client devices, three macro and 12 micro cells, 5 dBm client transmit power, 5 MHz bandwidth, FTP3 model traffic, 1 packet/s, 500 kB, Time sequence of measurements: 12 TTIs, and Batch size of training samples: 100.

Figure 7:
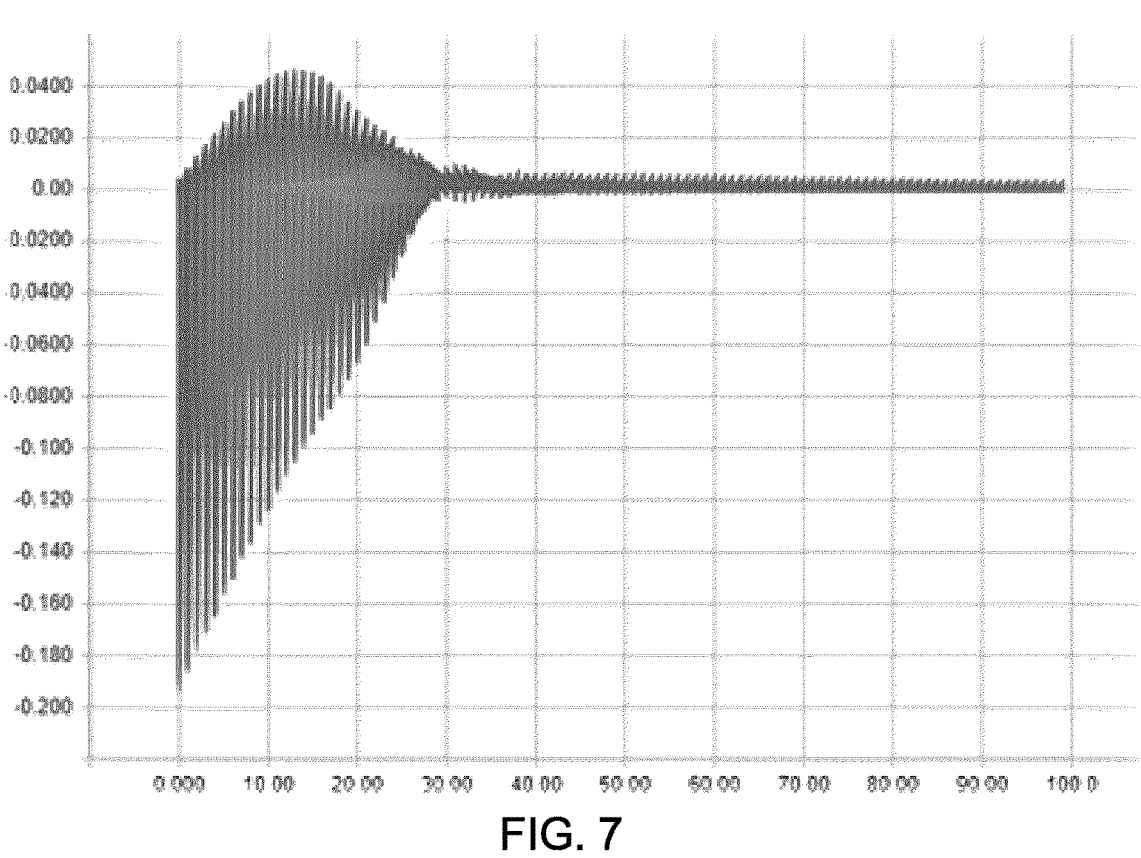
FIG. 7 shows an example embodiment of the subject matter described herein illustrating simulation results.
Figure 8:
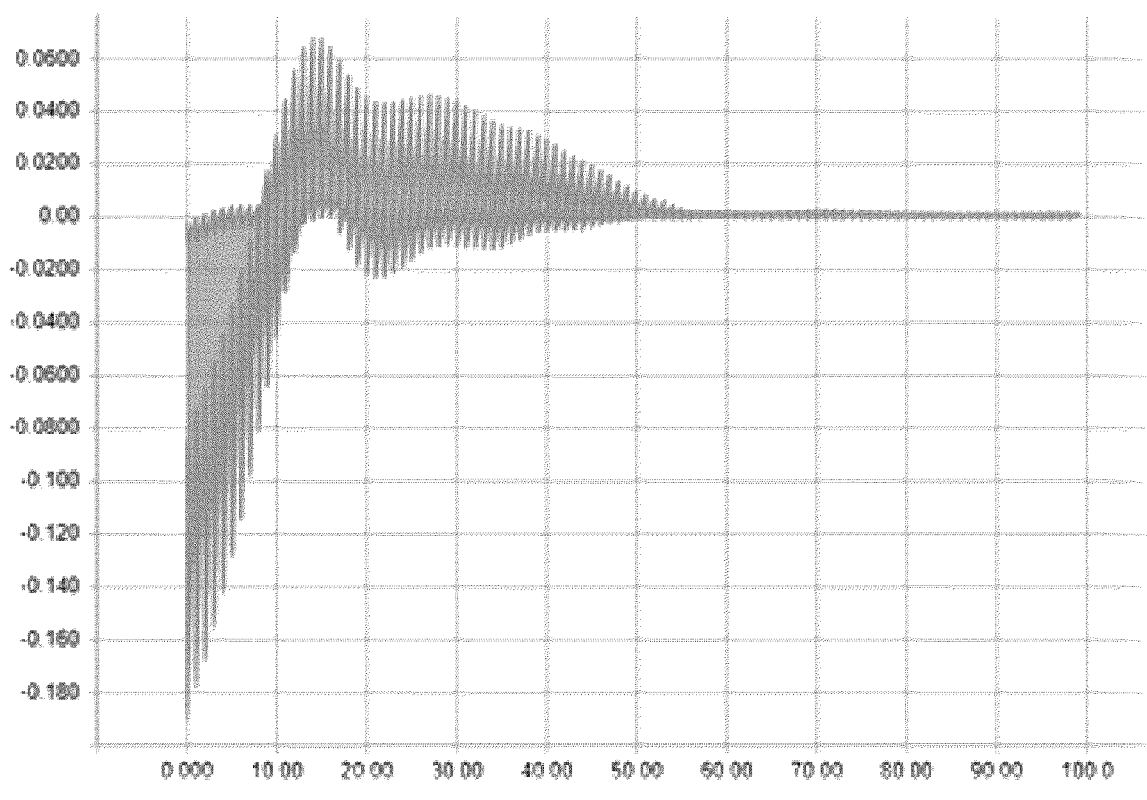
FIG. 8 shows another example embodiment of the subject matter described herein illustrating simulation results.
Figure 9:
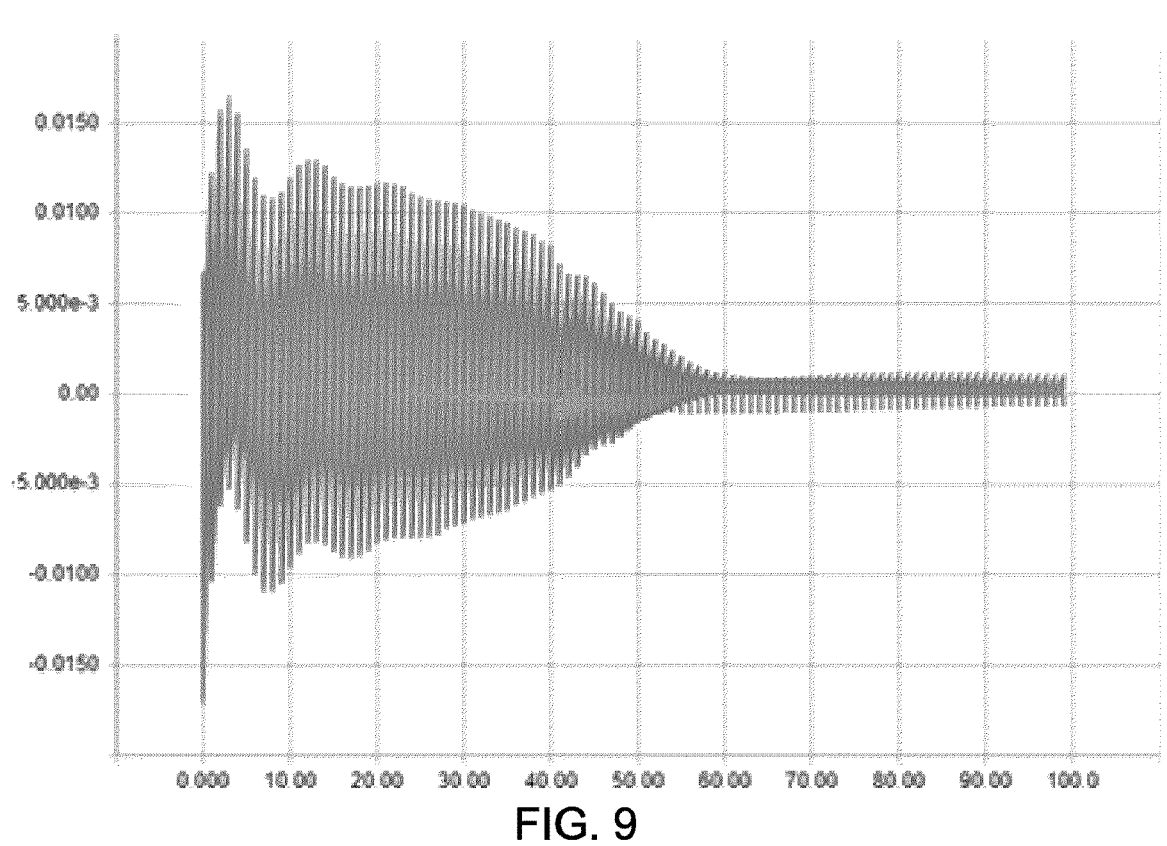
FIG. 9 shows another example embodiment of the subject matter described herein illustrating simulation results.

Clustering of client devices was performed over the similarity distance which results in three clustered models. The average gradient distribution of the client devices in these clusters are shown in FIGS. 7-9. Each figure corresponds to one cluster. This indicates that all of the models converge to a minimum loss but on different directions. This is caused by different propagation area and traffic arrival pattern making the prediction of RSRP and load from $\theta_e$ different, and different MCS selected making the prediction of delay, error probability and throughput from $\theta_s$ different.

Figure 10:
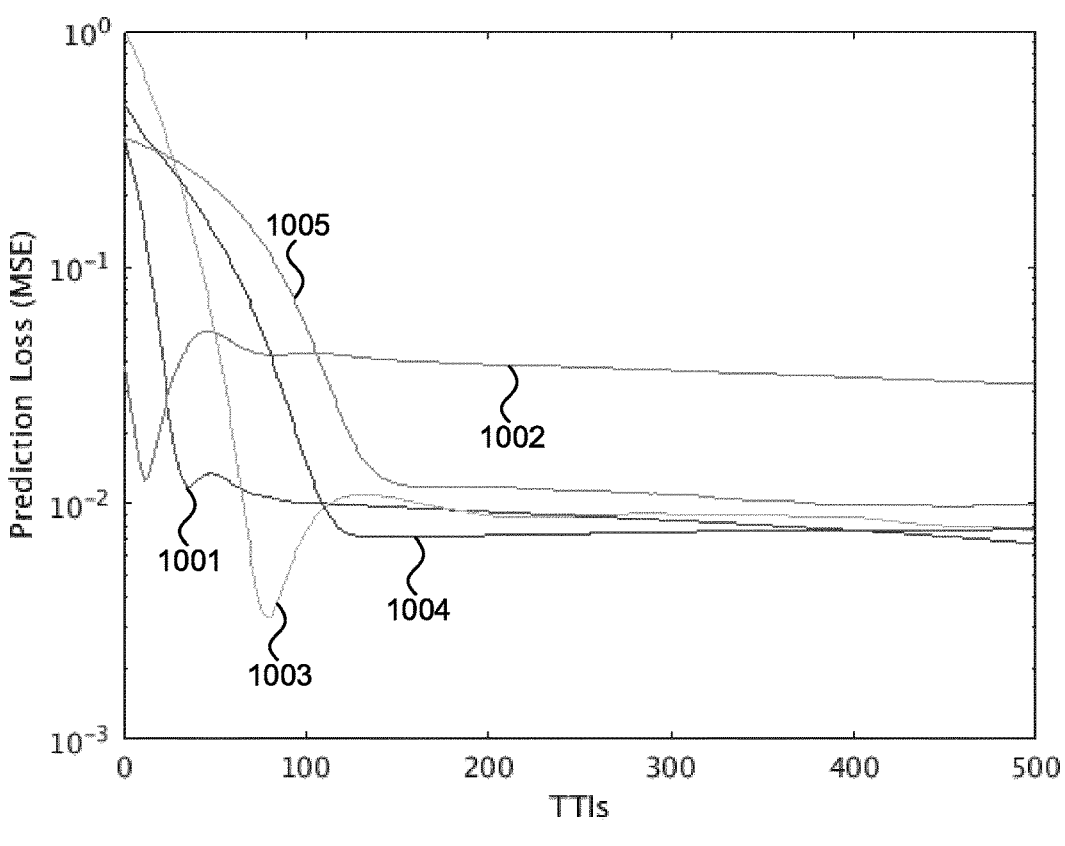
FIG. 10 shows another example embodiment of the subject matter described herein illustrating simulation results.

FIG. 10 shows another example embodiment of the subject matter described herein illustrating simulation results.

The prediction performance of the three clustered models illustrated in FIGS. 7-9 is shown in FIG. 10. Curve 1001 corresponds to training data, i.e. theoretical performance. Curve 1002 corresponds to a centralised system model. Curve 1003 corresponds to a first cluster model. Curve 1004 corresponds to a second cluster model. Curve 1005 corresponds to a third cluster model.

The prediction performance is computed as the mean square error loss of the predicted tuple (delay, error rate, transmission rate) of PDUs transmitted in different cells. A single centralized system model applied to all client devices, corresponding to curve 1002, is used as a baseline. The theoretical upper bound is the loss of training data, corresponding to curve 1001, which is shown to converge quickly. However, when using the model on the measured data, it shows a stable higher loss even though more samples are used to update the model in the following TTIs. On the other hand, the prediction loss of the three clustered models all converge to the upper bound of the training data after around 100 TTIs in this scenario. In the initial stage (i.e., first 100 TTIs), the loss is higher than the centralised model, because the clustered models have fewer collected samples in this initial period of time. However, it provides more accurate prediction with further trainings and approaches a good generalization on the measured data.

Figure 11:
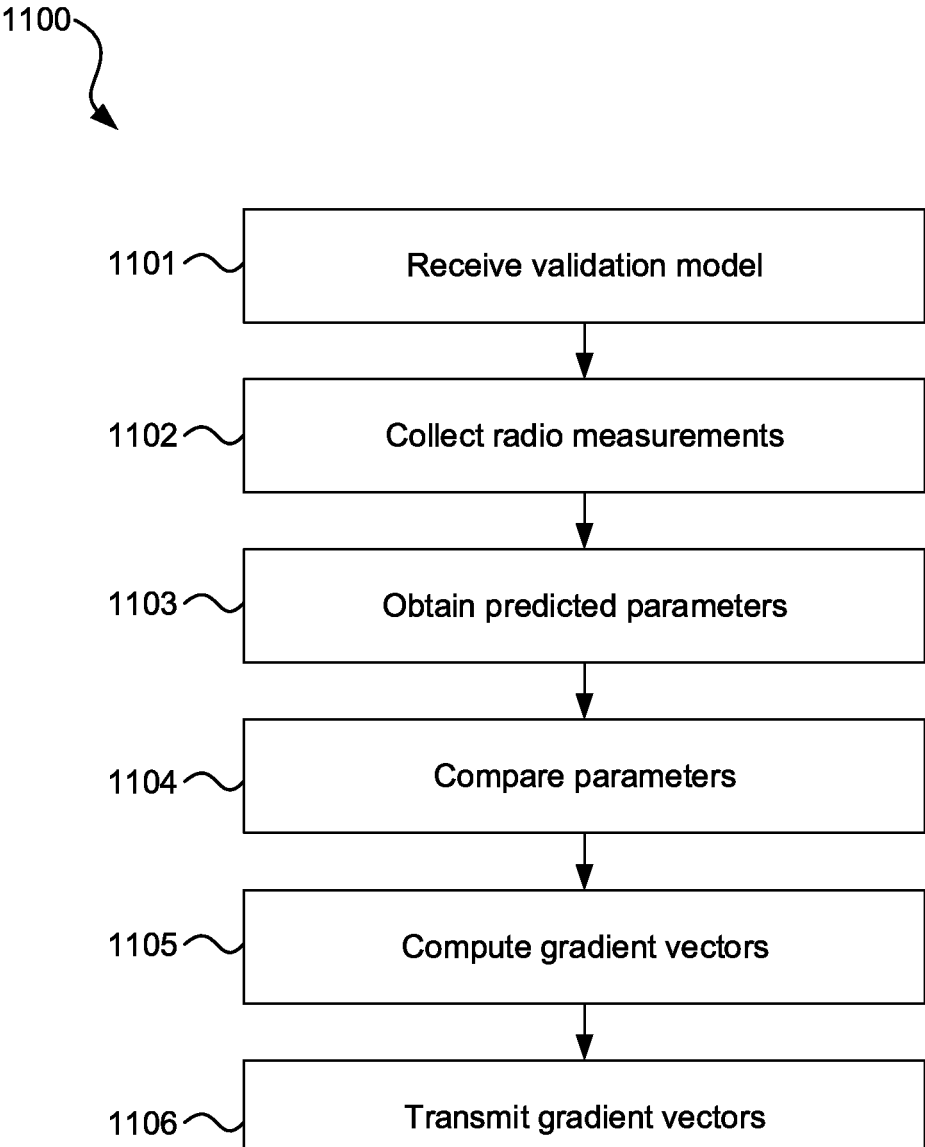
FIG. 11 shows an example embodiment of the subject matter described herein illustrating a method.

FIG. 11 shows an example embodiment of the subject matter described herein illustrating a method 1100.

According to an example embodiment, the method 1100 comprises receiving 1101 a validation model from a centralised unit device, wherein the validation model comprises a machine learning model configured to predict an output from an input based on a plurality of model parameters.

The method 1100 may further comprise collecting 1102 radio measurements corresponding to the input of the validation model and parameters corresponding to the output of the validation model.

The method 1100 may further comprise obtaining 1103 predicted parameters as the output of the validation model by feeding the collected radio measurements as the input into the validation model.

The method 1100 may further comprise comparing 1104 the collected parameters and the predicted parameters.

The method 1100 may further comprise computing 1105 a plurality of gradient vectors for the plurality of model parameters of the validation model based on the comparison between the collected parameters and the predicted parameters.

The method 1100 may further comprise transmitting 1106 the plurality of gradient vectors for the plurality of model parameters of the validation model to the centralised unit device.

Figure 12:
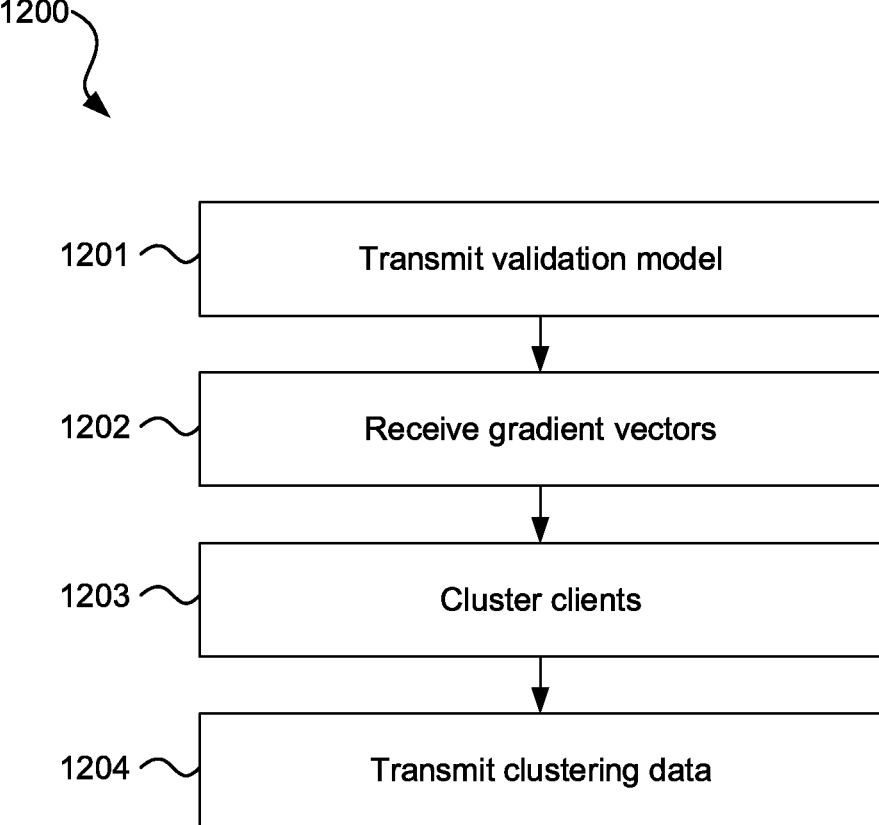
FIG. 12 shows another example embodiment of the subject matter described herein illustrating another method.

FIG. 12 shows an example embodiment of the subject matter described herein illustrating a method 1200.

According to an example embodiment, the method 1200 comprises transmitting 1201 a validation model to a plurality of client devices, wherein the validation model comprises a machine learning model configured to predict an output from an input based on a plurality of model parameters.

The method 1200 may further comprise receiving 1202 a plurality of gradient vectors for the plurality of model parameters of the validation model from each client device in the plurality of client devices.

The method 1200 may further comprise clustering 1203 the plurality of client devices based on the plurality of gradient vectors, wherein the clustering groups client devices with similar gradient vectors into one cluster.

The method 1200 may further comprise transmitting 1204 clustering data to at least one distributed unit device, wherein the clustering data indicates the clustering of client devices connected to the at least one distributed unit device.

It is to be understood that the order in which operations 1101-1106 and/or 1201-1204 are performed, may vary from the example embodiment depicted in FIGS. 11 and 12.

The method 1100 may be performed by the client device 200 of FIG. 2. The method 1200 may be performed by the centralised unit device 300 of FIG. 3. Further features of the methods 1100, 1200 directly result from the functionalities and parameters of the client device 200 and/or the centralised unit device 300. The methods 1100, 1200 can be performed, at least partially, by computer program(s).

At least some example embodiments disclosed herein may enable identifying the similarities of hidden radio environment and configuration of client devices in an implicit manner, without requiring extra radio measurements and signalling of radio data samples.

At least some example embodiments disclosed herein may enable splitting the ML model according to the radio data with similar distributions, regardless of different convergence speed on each client device. The gradient similarity represents the client devices model parameter having the same converging direction to a stable model. The exchange of actual data samples is not needed, which is also inaccurate for validation if the converging state at each UE is different.

At least some example embodiments disclosed herein may provide cluster models with generalized and stable outputs in dynamic environments. The client device can be assigned with different parameters once switched to different clusters, without the need of gradient descends to retrain the model from the data observed in new environment.

An apparatus may comprise means for performing any aspect of the method(s) described herein. According to an example embodiment, the means comprises at least one processor, and memory comprising program code, the at least one processor, and program code configured to, when executed by the at least one processor, cause performance of any aspect of the method.

The functionality described herein can be performed, at least in part, by one or more computer program product components such as software components. According to an example embodiment, the client device 200 and/or centralised unit device 300 comprise a processor configured by the program code when executed to execute the example embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and Graphics Processing Units (CPUs).

Any range or device value given herein may be extended or altered without losing the effect sought. Also any example embodiment may be combined with another example embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example embodiment or may relate to several example embodiments. The example embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the example embodiments described above may be combined with aspects of any of the other example embodiments described to form further example embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various example embodiments have been described above with a certain degree of particularity, or with reference to one or more individual example embodiments, those skilled in the art could make numerous alterations to the disclosed example embodiments without departing from the spirit or scope of this specification.

The invention claimed is:

1. A centralised unit device, comprising:

at least one processor; and at least one non-transitory memory storing instructions that, when executed with the at least one processor, cause the centralised unit device to:

transmit a validation model to a plurality of client devices, wherein the validation model comprises a machine learning model configured to predict an output from an input based on a plurality of model parameters;

receive a plurality of gradient vectors for the plurality of model parameters of the validation model from a client device in the plurality of client devices;

cluster the plurality of client devices based on the plurality of gradient vectors by computing a pairwise gradient similarity for each client device pair in the plurality of client devices and assigning each client device in the plurality of client devices to a cluster that maximises the pairwise gradient similarity between the client de-vice and client devices in the cluster; and transmit clustering data to at least one distributed unit device, wherein the clustering data indicates the clustering of client devices connected to the at least one distributed unit device.

2. The centralised unit device according to claim 1, wherein the instructions, when executed with the at least one processor, cause the centralised unit device to:

generate a cluster model for the cluster based on the gradient vectors received from the client devices in the cluster, wherein the cluster model comprises a machine learning model configured to predict an output from an input based on a plurality of model parameters; and transmit the cluster model of the cluster to the client devices in the cluster.

3. The centralised unit device according to claim 1, wherein the instructions, when executed with the at least one processor, cause the centralised unit device to:

receive a plurality of model parameters of a cluster model from the client devices in the cluster;

update the plurality of parameters of the cluster model based on the received model parameters from the client devices in the cluster; and transmit the updated model parameters of the cluster model to the client devices in the cluster.

4. The centralised unit device according to claim 1, wherein the instructions, when executed with the at least one processor, cause the centralised unit device to:

update the parameters of the validation model based on the received gradient vectors; and transmit the updated parameters of the validation model to the plurality of client devices.

5. The centralised unit device according to claim 1, wherein the client device includes:

at least one processor; and at least one non-transitory memory storing instructions that, when executed with the at least one processor, cause the client device to:

receive a validation model from the centralised unit device, wherein the validation model comprises a machine learning model configured to predict an output from an input based on a plurality of model parameters;

collect radio measurements corresponding to the input of the validation model and parameters corresponding to the output of the validation model;

obtain predicted parameters as the output of the validation model with feeding the collected radio measurements as the input into the validation model;

compare the collected parameters and the predicted parameters;

compute a plurality of gradient vectors for the plurality of model parameters of the validation model based on the comparison between the collected parameters and the predicted parameters; and transmit the plurality of gradient vectors for the plurality of model parameters of the validation model to the centralised unit device.

6. The centralised unit device according to claim 5, wherein the input of the validation model corresponds to radio measurements and the output of the validation model corresponds to quality of service parameters.

7. The centralised unit device according to claim 6, wherein at least one of the radio measurements comprises at least one of: reference signal received power, channel state information, or buffer status report, or the quality of service parameters comprises at least one of: delay, error probability, or data rate.

8. The centralised unit device according to claim 5, wherein the instructions, when executed with the at least one processor, cause the client device to compare the collected parameters and the predicted parameters with calculating a loss between the collected parameters and predicted parameters using a loss function indicated with the centralised unit device.

9. The centralised unit device according to claim 5, wherein the instructions, when executed with the at least one processor, cause the client device to:

receive a cluster model from a centralised unit device, wherein the cluster model comprises a machine learning model configured to predict an output from an input based on a plurality of model parameters;

collect radio measurements corresponding to the input of the cluster model and parameters corresponding to the output of the cluster model;

obtain predicted parameters as the output of the cluster model with feeding the collected radio measurements as the input into the cluster model;

compare the collected parameters and the predicted parameters;

compute a plurality of gradient vectors for the plurality of model parameters of the cluster model based on the comparison between the collected parameters and the predicted parameters; and update the plurality of parameters of the cluster model based on the gradient vectors for the plurality of model parameters of the cluster model.

10. The centralised unit device according to claim 9, wherein the instructions, when executed with the at least one processor, cause the client device to:

transmit the plurality of model parameters of the cluster model to the centralised unit device.

11. The centralised unit device according to claim 5, wherein the instructions, when executed with the at least one processor, cause the client device to use at least one of the cluster model or the updated cluster model for data transmission.

12. A method comprising:

transmitting a validation model to a plurality of client devices, wherein the validation model comprises a machine learning model configured to predict an output from an input based on a plurality of model parameters;

receiving a plurality of gradient vectors for the plurality of model parameters of the validation model from a client device in the plurality of client devices;

clustering the plurality of client devices based on the plurality of gradient vectors by computing a pairwise gradient similarity for each client device pair in the plurality of client devices and assigning each client device in the plurality of client devices to a cluster that maximises the pairwise gradient similarity between the client de-vice and client devices in the cluster; and transmitting clustering data to at least one distributed unit device, wherein the clustering data indicates the clustering of client devices connected to the at least one distributed unit device.

13. The method according to claim 12, further comprising:

receiving, by each of the plurality of client devices, a validation model from a centralised unit device, wherein the validation model comprises a machine learning model configured to predict an output from an input based on a plurality of model parameters;

collecting, by each of the plurality of client devices, radio measurements corresponding to the input of the validation model and parameters corresponding to the output of the validation model;

obtaining, by each of the plurality of client devices, predicted parameters as the output of the validation model with feeding the collected radio measurements as the input into the validation model;

comparing, by each of the plurality of client devices, the collected parameters and the predicted parameters;

computing, by each of the plurality of client devices, a plurality of gradient vectors for the plurality of model parameters of the validation model based on the comparison between the collected parameters and the predicted parameters; and transmitting, by each of the plurality of client devices, the plurality of gradient vectors for the plurality of model parameters of the validation model to the centralised unit device.

14. A non-transitory program storage device readable with an apparatus tangibly embodying a program of instructions executable with the apparatus for performing the method according to claim 13.

15. A non-transitory program storage device readable with an apparatus tangibly embodying a program of instructions executable with the apparatus for performing the method according to claim 12.

\* \* \* \* \*